(12) United States Patent
Park et al.

(10) Patent No.: US 9,453,150 B2
(45) Date of Patent: *Sep. 27, 2016

(54) RADICAL CURING ADHESIVE COMPOSITION AND POLARIZING PLATE COMPRISING SAME

(71) Applicant: LG CHEM, LTD., Seoul (KR)

(72) Inventors: Kwang-Seung Park, Daejeon (KR); Mi-Rin Lee, Daejeon (KR); Jun-Wuk Park, Daejeon (KR); Eun-Soo Huh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/654,759

(22) PCT Filed: Sep. 19, 2014

(86) PCT No.: PCT/KR2014/008723
§ 371 (c)(1),
(2) Date: Jun. 22, 2015

(87) PCT Pub. No.: WO2015/046814
PCT Pub. Date: Feb. 4, 2015

(65) Prior Publication Data
US 2015/0337180 A1    Nov. 26, 2015

(30) Foreign Application Priority Data

Sep. 30, 2013 (KR) .................. 10-2013-0116993
Sep. 12, 2014 (KR) .................. 10-2014-0121320

(51) Int. Cl.
| C09K 19/00 | (2006.01) |
| C09J 133/14 | (2006.01) |
| C09J 4/00 | (2006.01) |
| G02B 5/30 | (2006.01) |

(52) U.S. Cl.
CPC .............. C09J 133/14 (2013.01); C09J 4/00 (2013.01); *C09J 2433/003* (2013.01); *G02B 5/3033* (2013.01); *Y10T 428/10* (2015.01); *Y10T 428/105* (2015.01); *Y10T 428/1036* (2015.01); *Y10T 428/1041* (2015.01); *Y10T 428/31938* (2015.04)

(58) Field of Classification Search
CPC ............ G02B 1/04; G02B 1/08; G02B 1/10; G02B 1/105; G02B 1/14; G02B 5/30; G02B 5/3033; G02B 5/3025; G02B 5/305; C09J 133/14; C09J 11/00; Y10T 428/10; Y10T 428/1036; Y10T 428/1041; Y10T 428/105; Y10T 428/31938
USPC ....... 428/1.1, 1.3, 1.31, 1.5, 523; 522/28, 64
See application file for complete search history.

(56) References Cited

U.S. PATENT DOCUMENTS

2009/0270541 A1* 10/2009 Shinba .................. C08F 290/00
524/423

FOREIGN PATENT DOCUMENTS

| EP | 2840124 | * | 2/2015 | |
| JP | 2005010329 A | | 1/2005 | |
| JP | 2009175210 A | | 8/2009 | |
| KR | 100973677 B1 | | 4/2010 | |
| KR | 20100138902 A | | 12/2010 | |
| KR | 20130103290 A | | 9/2013 | |
| KR | WO 2014204142 A1 | * | 12/2014 | ............... C09J 4/00 |

\* cited by examiner

*Primary Examiner* — Ruiyun Zhang
(74) *Attorney, Agent, or Firm* — Dentons US LLP

(57) ABSTRACT

The present invention relates to a radical-curable adhesive composition including a first compound represented by the following [Chemical Formula I]; a radical-curable second compound having two or more benzene rings, (meth)acryloyl groups and carboxyl groups each in the molecule; and a radical initiator, and a polarizing plate including the radical-curable adhesive composition.

19 Claims, No Drawings

RADICAL CURING ADHESIVE COMPOSITION AND POLARIZING PLATE COMPRISING SAME

This application is a National Stage Entry of International Application No. PCT/KR2014/008723, filed Sep. 19, 2014, and claims the benefit of Korean Application No. 10-2013-0116993, filed on Sep. 30, 2013, Korean Application No. 10-2014-0121320, filed on Sep. 12, 2014, all of which are hereby incorporated by reference in their entirety for all purposes as if fully set forth herein.

TECHNICAL FIELD

The present disclosure relates to a radical-curable adhesive composition and a polarizing plate including the same, and in particular, to a radical-curable adhesive composition having excellent adhesive strength between a polarizer and a protective film, and having excellent water resistance and heat resistance, and a polarizing plate including the same.

BACKGROUND ART

Polarizing plates having a structure in which a protective film is laminated on one or both surfaces of a polarizer formed with a polyvinyl alcohol (hereinafter, referred to 'PVA')-based resin dyed with dichroic dye or iodine using an adhesive have been commonly used. Triacetyl cellulose (TAC)-based films have been normally used as a polarizing plate protective film in the art, however, such TAC films have a problem of being readily deformed in high temperature and high humidity environments. Accordingly, protective films made of various materials capable of replacing TAC films have been recently developed, and for example, a method of using polyethylene terephthalate (PET), a cycloolefin polymer (COP), and an acryl-based film either alone or as a mixture thereof has been proposed.

Herein, aqueous adhesives formed with an aqueous solution of a polyvinyl alcohol-based resin are normally used as an adhesive used to attach the polarizer and the protective film. However, aqueous adhesives have a problem in that the use is limited depending on the material of a film, since adhesive strength is weak when acryl-based films or COP films and the like are used as the protective film instead of TAC. In addition to the problem of adhesive strength defects depending on the materials, the aqueous adhesive also has problems in that curls are generated in a polarizing plate due to a drying process of the aqueous adhesive, and initial optical properties are degraded when materials of the protective film used on both surfaces of a PVA element are different. Moreover, a drying process is absolutely required when the aqueous adhesive is used, and differences in moisture permeability, heat expansion and the like occur in the drying process leading to a problem of a defect rate increase. As an alternative to solve the problems described above, methods of using non-aqueous adhesives instead of aqueous adhesives have been proposed.

Non-aqueous adhesives for a polarizing plate that have been proposed so far may be divided into radical-curable adhesives and cation-curable adhesives depending on the types of curing. Cation-curable adhesives have an advantage in that excellent adhesive strength is obtained for films made of various materials, but have many disadvantages in the manufacturing process due to a low curing speed and a low degree of curing. Radical-curable adhesives having an acryl-based compound including a hydrophilic functional group as a main component have been proposed in order to solve the problems of such cation-curable adhesives. However, in the case of the radical-curable adhesive having an acryl-based compound as a main component, the adhesive has a low glass transition temperature after radical curing, therefore, there has been a problem in that a polarizing plate prepared using this adhesive has poor heat resistance reliability.

In view of the above, technologies additionally adding hydrophilic and multifunctional monomers and mixing these with the acryl-based compound have been proposed in order to increase a glass transition temperature of an adhesive. However, when these monomers are additionally added, the glass transition temperature of the adhesive may be raised, however, water resistance, which is a fundamental property that a polarizing plate needs to have, is very poor, and this has been a fatal disadvantage in using this adhesive in a polarizing plate.

Accordingly, new radical-curable adhesives having excellent adhesive strength between a polarizer and a protective film, and having excellent water resistance and heat resistance have been required.

DISCLOSURE

Technical Problem

In view of the above, an object of the present invention is to provide a radical-curable adhesive composition having excellent adhesive strength between a polarizer and a protective film, and having excellent water resistance and heat resistance, and a polarizing plate including the radical-curable adhesive composition.

Technical Solution

In one aspect, the present invention provides a radical-curable adhesive composition including a first compound represented by the following [Chemical Formula I]; a radical-curable second compound having two or more benzene rings, (meth)acryloyl groups and carboxyl groups each in the molecule; and a radical initiator.

[Chemical Formula I]

In [Chemical Formula I], $R_1$ is an ester group or an ether group; $R_2$ is a $C_{1\sim10}$ alkyl group, a $C_{4\sim10}$ cycloalkyl group or a combination thereof, and herein, $R_2$ has at least one hydroxyl substituent in the molecule; and $R_3$ is hydrogen, or a substituted or unsubstituted $C_{1\sim10}$ alkyl group.

Meanwhile, the second compound is preferably a compound represented by the following [Chemical Formula II].

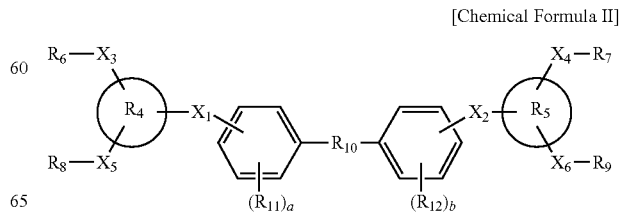

[Chemical Formula II]

In [Chemical Formula II], $R_4$ and $R_5$ are each independently a $C_{1\sim10}$ aliphatic chain, a $C_{4\sim14}$ aliphatic ring, a $C_{6\sim14}$ aromatic ring or a combination thereof; $R_6$ and $R_7$ are each independently a $C_{1\sim14}$ alkyl group, a $C_{4\sim14}$ cycloalkyl group, a $C_{6\sim14}$ aryl group or a combination thereof, and herein, $R_6$ and $R_7$ each independently have at least one carboxyl substituent in the molecule; $R_8$ and $R_9$ are each independently an acryloyl group or a methacryloyl group; $R_{10}$ is a single bond or a $C_{1\sim10}$ alkylene group; $R_{11}$ and $R_{12}$ are each independently a halogen atom or a $C_{1\sim10}$ alkyl group; a and b are each independently an integer of 0 to 2; $X_1$ and $X_2$ are each independently a single bond or —O—; $X_3$ and $X_4$ are each independently a single bond, —O—, —CO—, —COO— or —OCO—; and $X_5$ and $X_6$ are each independently a single bond or —O—.

Meanwhile, the radical-curable adhesive composition preferably includes the first compound in 10 to 80 parts by weight, the second compound in 10 to 80 parts by weight and the radical initiator in 0.5 to 10 parts by weight, with respect to 100 parts by weight of the adhesive composition.

Meanwhile, the first compound may include one or more types selected from the group consisting of compounds represented by the following [Chemical Formula 1] to [Chemical Formula 10].

[Chemical Formula 1]

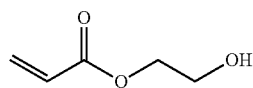

[Chemical Formula 2]

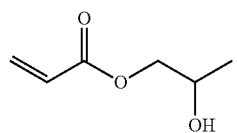

[Chemical Formula 3]

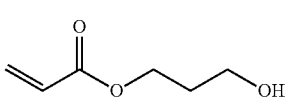

[Chemical Formula 4]

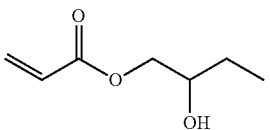

[Chemical Formula 5]

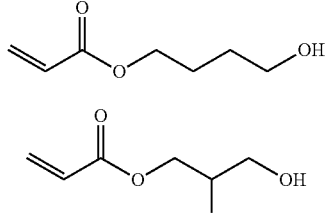

[Chemical Formula 6]

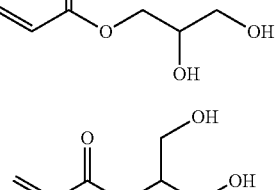

[Chemical Formula 7]

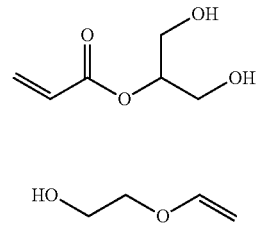

[Chemical Formula 8]

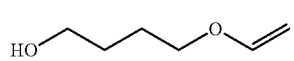

[Chemical Formula 9]

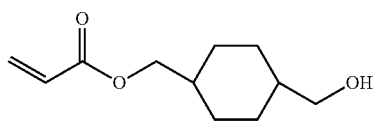

[Chemical Formula 10]

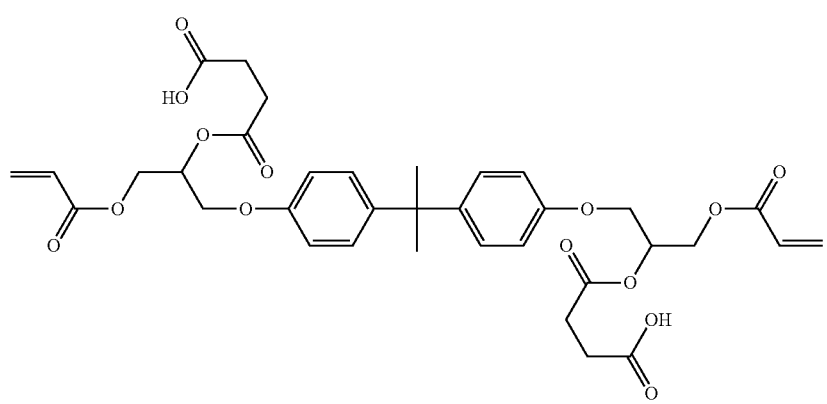

In addition, the second compound may include one or more types of compounds selected from the group consisting of compounds represented by the following [Chemical Formula 11] and [Chemical Formula 12].

[Chemical Formula 11]

-continued

[Chemical Formula 12]

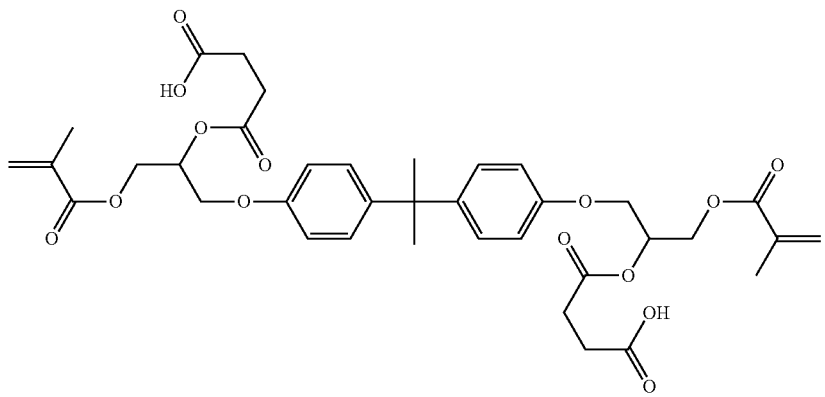

Meanwhile, an acid value of the second compound is preferably 50 to 300 mg KOH/g.

Meanwhile, the radical-curable adhesive composition may further include a photoacid generator.

Herein, a content of the photoacid generator is preferably 0.5 to 10 parts by weight with respect to 100 parts by weight of the radical-curable adhesive composition.

Meanwhile, the radical-curable adhesive composition preferably has a glass transition temperature of 60° C. or higher after curing.

In addition, the radical-curable adhesive composition preferably has viscosity of 10 to 200 cP.

In another aspect, the present invention provides a polarizing plate including a polarizer; an adhesive layer formed on at least one surface of the polarizer; and a polarizer protective film formed on the adhesive layer, wherein the adhesive layer is formed using the radical-curable adhesive composition.

Herein, the polarizer the polarizer is preferably a polyvinyl alcohol-based film in which iodine or dichroic dye is adsorbed and oriented.

Advantageous Effects

A radical-curable adhesive composition according to the present invention has excellent adhesive strength for a polarizer and a protective film, and has excellent water resistance, therefore, may be favorably used in between a polarizer and a protective film having a high water content.

In addition, a radical-curable adhesive composition according to the present invention has a high glass transition temperature, and therefore, has an advantage in that a polarizing plate using the composition has excellent heat resistance.

MODE FOR DISCLOSURE

Hereinafter, preferred embodiments of the present invention will be described. However, embodiments of the present invention may be modified to various other forms, and the scope of the present invention is not limited to the embodiments described below. In addition, embodiments of the present invention are provided in order to more completely describe the present invention for those having average knowledge in the art.

1. Radical-Curable Adhesive Composition

As a result of extensive studies, the inventors of the present invention have found that, when a radical-curable compound having two or more benzene rings, (meth)acryloyl groups and carboxyl groups each in the molecule is mixed to an acryl-based compound having a hydroxyl group, and the like, very superior water resistance and heat resistance are obtained, and completed the present invention.

More specifically, a radical-curable adhesive composition of the present invention includes a first compound represented by [Chemical Formula I]; a radical-curable second compound having two or more benzene rings, (meth)acryloyl groups and carboxyl groups each in the molecule; and a radical initiator.

[Chemical Formula I]

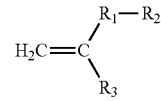

In [Chemical Formula I], $R_1$ is an ester group or an ether group; $R_2$ is a $C_{1\sim10}$ alkyl group, a $C_{4\sim10}$ cycloalkyl group or a combination thereof, and herein, $R_2$ has at least one hydroxyl substituent in the molecule; and $R_3$ is hydrogen, or a substituted or unsubstituted $C_{1\sim10}$ alkyl group.

More preferably, the radical-curable adhesive composition of the present invention may include the first compound in 10 to 80 parts by weight, the second compound in 10 to 80 parts by weight and the radical initiator in 0.5 to 10 parts by weight, with respect to 100 parts by weight of the adhesive composition.

1-1. First Compound

First, the first compound is a component for obtaining adhesive strength of an adhesive using hydrogen bonding by a hydroxyl group, and various compounds represented by the following [Chemical Formula I] may be used.

[Chemical Formula I]

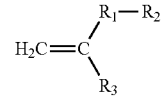

In [Chemical Formula I], $R_1$ is an ester group or an ether group; $R_2$ is a $C_{1\sim10}$ alkyl group, a $C_{4\sim10}$ cycloalkyl group or a combination thereof, and herein, $R_2$ has at least one hydroxyl substituent in the molecule; and $R_3$ is hydrogen, or a substituted or unsubstituted $C_{1\sim10}$ alkyl group.

Herein, in $R_2$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like.

In addition, in $R_2$, the cycloalkyl group means a nonaromatic monocyclic, bicyclic or tricyclic hydrocarbon part of 4 to 14, 4 to 10, or 4 to 6 ring carbons, and the cycloalkyl group in the present specification may include at least one unsaturated bond in the molecule. Meanwhile, examples of the cycloalkyl group may include, but are not limited to, a cyclopentane ring, a cyclohexane ring and the like.

Meanwhile, the hydroxyl group may substitute any position of the alkyl group or the cycloalkyl group. For example, the hydroxyl group may position at the end of the alkyl group, or in the middle of the alkyl group. Meanwhile, the rest of the hydrogen atoms included in the alkyl group or the cycloalkyl group may be substituted with any substituent.

In addition, in $R_3$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like. One or more hydrogen atoms included in the alkyl group may be substituted with any substituent.

In the present invention, examples of the first compound may include, but are not limited to, one or more types of compounds selected from the group consisting of compounds represented by the following [Chemical Formula 1] to [Chemical Formula 10].

[Chemical Formula 1]
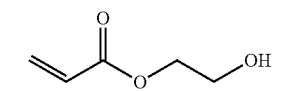

[Chemical Formula 2]
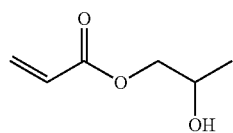

[Chemical Formula 3]
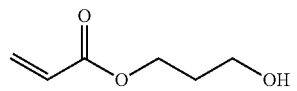

[Chemical Formula 4]
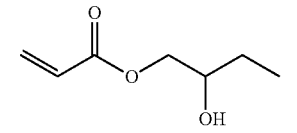

[Chemical Formula 5]
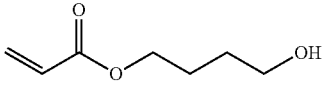

[Chemical Formula 6]
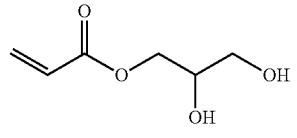

[Chemical Formula 7]
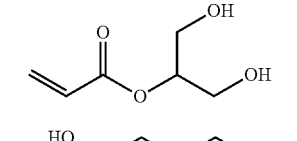

[Chemical Formula 8]
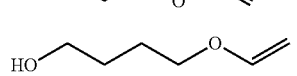

[Chemical Formula 9]

-continued

[Chemical Formula 10]
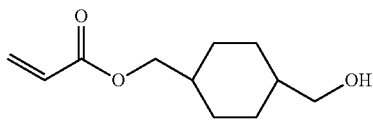

Meanwhile, the content of the first compound may be approximately 10 to 80 parts by weight, preferably approximately 20 to 75 parts by weight, and more preferably approximately 30 to 65 parts by weight, with respect to 100 parts by weight of the whole adhesive composition. When the content of the first compound is too low, adhesive strength is difficult to be secured, and when the content is too high, a glass transition temperature of the adhesive composition decreases, which leads to the reduction of heat resistance.

1-2. Second Compound

Next, the second compound included in the radical-curable adhesive composition according to the present invention is a component for providing moisture resistance for an adhesive, and furthermore, enhancing heat resistance by increasing a glass transition temperature of the adhesive composition, and various radical-curable compounds having two or more benzene rings, (meth)acryloyl groups and carboxyl groups each in the molecule may be used. Herein, the (meth)acryloyl group means an acryloyl group or a methacryloyl group.

Specifically, the second compound of the present invention enhances adhesive strength by removing moisture, which interrupts the obtainment of adhesive strength through hydrogen bonding of the hydroxyl group of the first compound with a polarizer, through the carboxyl group present in the molecule, and furthermore, enhances water resistance by the adhesive layer becoming dense and rigid making the passing through of moisture difficult due to the benzene ring-containing part present in the molecule having high molecular density. In addition, the second compound itself has a high glass transition temperature due to the benzene ring-containing part present in the molecule having high molecular density, and a glass transition temperature of the adhesive layer increases since the adhesive layer becomes rigid due to the hydrogen bonding between the carboxyl group present in the molecule and the hydroxyl group of the first compound.

Meanwhile, in the present invention, the second compound is preferably, but not limited to, a compound represented by the following [Chemical Formula II]. In this case, particularly excellent water resistance and heat resistance may be secured.

[Chemical Formula II]
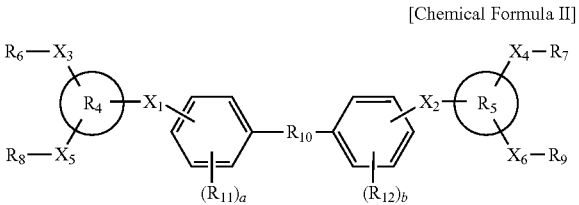

In [Chemical Formula II], $R_4$ and $R_5$ are each independently a $C_{1-10}$ aliphatic chain, a $C_{4-14}$ aliphatic ring, a $C_{6-14}$ aromatic ring or a combination thereof; $R_6$ and $R_7$ are each independently a $C_{1-24}$ alkyl group, a $C_{4-24}$ cycloalkyl group, a $C_{6-24}$ aryl group or a combination thereof, and herein, $R_6$ and $R_7$ each independently have at least one carboxyl substituent in the molecule; $R_8$ and $R_9$ are each independently an acryloyl group or a methacryloyl group; $R_{10}$ is a single bond or a $C_{1\sim10}$ alkylene group; $R_{11}$ and $R_{12}$ are each independently a halogen atom or a $C_{1\sim10}$ alkyl group; a and b are each independently an integer of 0 to 2; $X_1$ and $X_2$ are each independently a single bond or —O—; $X_3$ and $X_4$ are each independently a single bond, —O—, —CO—, —COO— or —OCO—; and $X_5$ and $X_6$ are each independently a single bond or —O—.

Herein, in $R_4$ and $R_5$, the aliphatic chain means a linear or branched, saturated or unsaturated trivalent hydrocarbon part of 1 to 10, 1 to 8, or 1 to 4 carbon atoms, and examples thereof may include, but are not limited to, a trivalent alkane chain such as a methane chain, an ethane chain, a propane chain, a butane chain, a pentane chain, a hexane chain, a heptane chain, an octane chain, a nonane chain and a decane chain. One or more hydrogen atoms included in the aliphatic hydrocarbon chain may be substituted with any substituent.

In addition, in $R_4$ and $R_5$, the aliphatic ring means a trivalent saturated or unsaturated nonaromatic monocyclic, bicyclic or tricyclic hydrocarbon part of 4 to 14, 4 to 10, or 4 to 6 ring carbons, and examples thereof may include, but are not limited to a trivalent cycloalkane ring such as a cyclopentane ring and a cyclohexane ring, or a trivalent cycloalkene ring such as a cyclopentene ring, a cyclohexene ring and a cyclooctene ring. One or more hydrogen atoms included in the aliphatic hydrocarbon ring may be substituted with any substituent.

Furthermore, in $R_4$ and $R_5$, the aromatic ring means a trivalent monocyclic, bicyclic or tricyclic aromatic hydrocarbon part having 6 to 14, or 6 to 12 ring atoms, and examples thereof may include, but are not limited to a trivalent, benzene ring, naphthalene ring, anthracene ring, biphenyl ring and the like. One or more hydrogen atoms included in the aromatic hydrocarbon ring may be substituted with any substituent.

In addition, in $R_6$ and $R_7$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like.

Furthermore, in $R_6$ and $R_7$, the cycloalkyl group means a nonaromatic monocyclic, bicyclic or tricyclic hydrocarbon part of 4 to 14, 4 to 10, or 4 to 6 ring carbons, and the cycloalkyl group in the present specification may include at least one unsaturated bond in the molecule. Meanwhile, examples of the cycloalkyl group may include, but are not limited to, a cyclopentane ring, a cyclopentene ring, a cyclohexane ring, a cyclohexene ring and the like.

In addition, in $R_6$ and $R_7$, the aryl group means a monocyclic, bicyclic or tricyclic aromatic hydrocarbon part having 6 to 14, or 6 to 12 ring carbons, and examples thereof may include, but are not limited to, a benzene ring, a naphthalene ring, an anthracene ring, a biphenyl ring and the like.

Meanwhile, the carboxyl group may substitute any position of the alkyl group, the cycloalkyl group or the aryl group. For example, the carboxyl group may position at the end of the alkyl group, or in the middle of the alkyl group. Meanwhile, the rest of the hydrogen atoms included in the alkyl group, the cycloalkyl group or the aryl group may be substituted with any substituent.

In addition, in $R_n$, the alkylene group means a linear or branched divalent hydrocarbon part of 1 to 10, 1 to 8, or 1 to 4 carbon atoms, and the alkylene group in the present specification may include at least one unsaturated bond in the molecule. Meanwhile, examples of the alkylene group may include, but are not limited to, methylene, ethylene, trimethylene, tetramethylene, pentamethylene, hexamethylene, heptamethylene, nonamethylene, decamethylene and the like. However, among these, methylene or dimethylmethylene is particularly preferable. One or more hydrogen atoms included in the alkylene group may be substituted with any substituent.

Furthermore, in $R_{11}$ and $R_{12}$, the alkyl group means a linear or branched hydrocarbon part of 1 to 10, 1 to 8, or 1 to 4 carbon atoms, and the alkyl group in the present specification may include at least one unsaturated bond in the molecule. Meanwhile, examples of the alkyl group may include, but are not limited to, methyl, ethyl, propyl, butyl, pentyl, hexyl, heptyl, octyl, nonyl, decanyl and the like. One or more hydrogen atoms included in the alkyl group may be substituted with any substituent.

More specifically, the second compound may include, but is not limited to, one or more types of compounds selected from the compounds represented by the following [Chemical Formula 11] and [Chemical Formula 12].

[Chemical Formula 11]

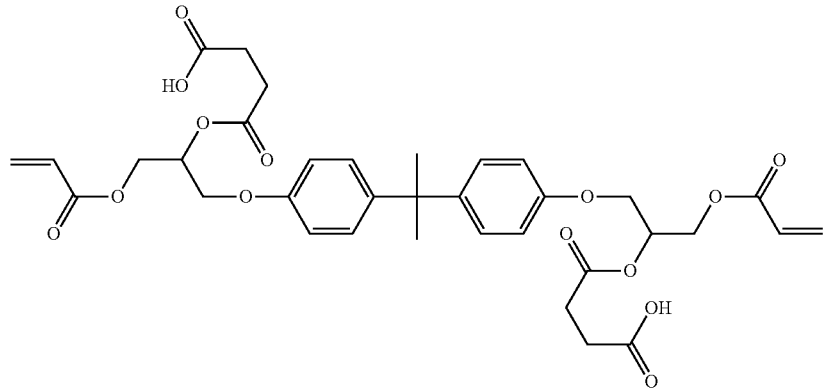

-continued

[Chemical Formula 12]

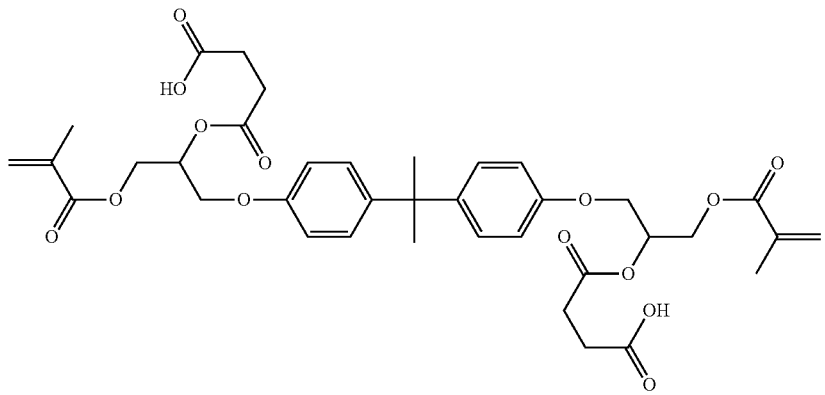

Meanwhile, the content of the second compound may be approximately 10 to 80 parts by weight, preferably approximately 20 to 75 parts by weight, and more preferably approximately 30 to 65 parts by weight, with respect to 100 parts by weight of the whole adhesive composition. When the content of the second compound is too low, sufficient water resistance and heat resistance may not be secured, and when the content is too high, adhesive strength may be low.

Meanwhile, the acid value of the second compound may be 50 to 300 mg KOH/g, and preferably approximately 50 to 250 mg KOH/g or 100 to 200 mg KOH/g. Herein, the acid value means a mg number of potassium hydroxide (KOH) required for completely neutralizing 1 g of a sample. In this case, excellent water resistance and heat resistance such as above may be effectively secured.

1-3. Radical Initiator

Next, the radical initiator included in the radical-curable adhesive composition according to the present invention is for enhancing a curing speed by facilitating radical polymerization, and radical initiators generally used in the art may be used without limit as the radical initiator.

More specifically, examples of the radical initiator may include one or more types selected from the group consisting of 1-hydroxy-cyclohexyl-phenyl-ketone, 2-hydroxy-2-methyl-1-phenyl-1-propanone, 2-hydroxy-1-[4-(2-hydroxyethoxy) phenyl]-2-methyl-1-propanone, methyl benzoylformate, oxy-phenyl-acetic acid-2-[2 oxo-2phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide and phenylbis(2,4,6-trimethylbenzoyl)-phosphine oxide. In the present invention, phenylbis(2,4,6-trimethylbenzoyl)-phosphine oxide may be particularly preferably used.

Meanwhile, the content of the radical initiator may be preferably, for example, approximately 0.5 to 10 parts by weight, 1 to 5 parts by weight, or 2 to 3 parts by weight, with respect to 100 parts by weight of the radical-curable adhesive composition. When the content of the radical initiator satisfies the above range, curing of an adhesive may be smoothly accomplished.

1-4. Photoacid Generator

Meanwhile, the radical-curable adhesive composition of the present invention may further include a photoacid generator as necessary. A photoacid generator is a compound generating an acid (H+) by active energy rays, and when a photoacid generator is additionally included, there is an advantage in that the acid value of an adhesive may be adjusted through the photoacid generator, and adhesive strength may be more improved therethrough.

A photoacid generator capable of being used in the present invention preferably includes, for example, a sulfonium salt or an iodonium salt. Specific examples of the photoacid generator including a sulfonium salt or an iodonium salt may include one or more types selected from the group consisting of diphenyl(4-phenylthio)phenylsulfonium hexafluoroantimonate, diphenyl(4-phenylthio)phenylsulfonium hexafluorophosphate, (phenyl)[4-(2-methylpropyl)phenyl]-iodonium hexafluorophosphate, (thiodi-4,1-phenylene)bis(diphenylsulfonium) dihexafluoroantimonate and (thiodi-4,1-phenylene)bis(diphenylsulfonium) dihexafluorophosphate, but are not limited thereto.

Meanwhile, the content of the photoacid generator may be 10 parts by weight or less, and preferably 0.5 to 10 parts by weight, 2 to 8 parts by weight, or 3 to 7 parts by weight, with respect to 100 parts by weight of the radical-curable adhesive composition. When the content of photoacid generator included in the radical-curable adhesive composition according to the present invention satisfies the above range, there is an advantage in that adhesive strength is more improved compared to cases in which the photoacid generator is not included, or the content of the photoacid generator does not satisfy the above range.

1-5. Physical Properties of Radical-curable Adhesive Composition

Meanwhile, the radical-curable adhesive composition according to the present invention preferably has a glass transition temperature of 60° C. or higher after curing, for example, approximately 60 to 200° C., 65 to 150° C. or 65 to 120° C. A polarizing plate prepared using the radical-curable adhesive composition according to the present invention having a glass transition temperature in the range described above has advantages in that heat resistance and water resistance are excellent.

In addition, the radical-curable adhesive composition according to the present invention preferably has viscosity of approximately 10 to 200 cP, or 20 to 100 cP. When the viscosity of the adhesive composition satisfies the above range, there is an advantage in that the adhesive layer may be formed to be thin, and workability is excellent due to low viscosity.

Furthermore, the radical-curable adhesive composition according to the present invention may have an adhesive layer thickness of 0.5 to 10 μm, or 1 μm to 5 μm. When the adhesive layer is too thin, uniformity and adhesive strength of the adhesive layer may be reduced, and when the adhesive layer is too thick, there may be a problem of a polarizing plate exterior getting wrinkled.

The radical-curable adhesive composition of the present invention described above not only has excellent adhesive strength for films made of various materials, but also has excellent water resistance and heat resistance, and therefore, may be favorably used for a polarizing plate. In addition, the radical-curable adhesive composition according to the present invention has a high curing speed and a high degree of curing, therefore, there is an advantage in that productivity may increase when a polarizing plate is prepared.

2. Polarizing Plate

Next, a polarizing plate according to the present invention will be described.

A polarizing plate of the present invention includes a polarizer; a radical-curable adhesive layer formed on at least one surface of the polarizer; and a protective film formed on the adhesive layer, wherein the adhesive layer is formed using the radical-curable adhesive composition according to the present invention described above.

2-1. Polarizer

First, the polarizer is not particularly limited, and polarizers well known in the art, for example, films formed with polyvinyl alcohol (PVA) including iodine or dichroic dye may be used. The polarizer may be prepared by dyeing a PVA film with iodine or dichroic dye, however, the preparation method is not particularly limited. In the present specification, a polarizer means a state not including a protective film, and a polarizing plate means a state including a polarizer and a protective film.

2-2. Adhesive Layer

Next, the radical-curable adhesive layer is formed using the radical-curable adhesive composition according to the present invention described above, and may be formed using methods well known in the art. For example, a method of forming an adhesive layer by coating an adhesive composition on one surface of a protective film, laminating a polarizer and the protective film, and then curing the result through irradiating active energy rays such as ultraviolet rays, visible rays, an electron beam and X-rays may be used. Herein, the irradiation method is not particularly limited, and for example, a method of irradiating ultraviolet rays of approximately 10 to 2500 mJ/cm$^2$ with an ultraviolet ray irradiator (fusion lamp, D bulb) may be used.

2-3. Protective Film

Next, the protective film is used for supporting and protecting a polarizer, and protective films made of various materials generally known in the art, such as cellulose-based films, polyethylene terephthalate (PET) films, cycloolefin polymer (COP) films and acryl-based films, may be used without limit. Among these, using an acryl-based film is particularly preferable considering optical properties, durability, economic efficiency and the like.

Meanwhile, an acryl-based film capable of being used in the present invention may be obtained by extrusion molding materials to be molded including a (meth)acrylate-based resin as a main component. Herein, the (meth)acrylate-based resin is a material having a resin including a (meth)acrylate-based unit as a main component, and the concept also includes not only a homopolymer resin formed with a (meth)acrylate-based unit, but also a copolymer resin copolymerizing other monomer units in addition to a (meth)acrylate-based unit, and a blend resin blending other resins to such a (meth)acrylate-based resin.

Meanwhile, the (meth)acrylate-based unit may be, for example, an alkyl(meth)acrylate-based unit. Herein, the alkyl(meth)acrylate-based unit means both an alkylacrylate-based unit and an alkylmethacrylate-based unit, and the alkyl group of the alkyl(meth)acrylate-based unit preferably has a carbon number of 1 to 10, and more preferably has a carbon number of 1 to 4.

In addition, the monomer unit capable of being copolymerized with the (meth)acrylate-based unit may include a styrene-based unit, a maleic anhydride-based unit, a maleimide-based unit and the like. Herein, examples of the styrene-based unit may include, but are not limited to, styrene, α-methylstyrene and the like; examples of the maleic anhydride-based monomer may include, but are not limited to, maleic anhydride, methyl maleic anhydride, cyclohexyl maleic anhydride, phenyl maleic anhydride and the like; and examples of the maleimide-based monomer may include, but are not limited to, maleimide, N-methylmaleimide, N-cyclohexylmaleimide, N-phenylmaleimide and the like. These may be used either alone or as a mixture.

Meanwhile, the acryl-based film may be a film including a (meth)acrylate-based resin having a lactone ring structure. Specific examples of the (meth)acrylate-based resin having a lactone ring structure may include a (meth)acrylate-based resin having a lactone ring structure disclosed in Japanese Patent Application Laid-Open Publication No. 2000-230016, Japanese Patent Application Laid-Open Publication No. 2001-151814 and Japanese Patent Application Laid-Open Publication No. 2002-120326, and the like.

A method for preparing the acryl-based film is not particularly limited, and for example, the acryl-based film may be prepared by preparing a thermoplastic resin composition by sufficiently mixing a (meth)acrylate-based resin, other polymers, additives and the like using any proper mixing method, and then molding the result to a film, or the acryl-based film may be prepared by preparing a (meth)acrylate-based resin, other polymers, additives and the like as a separate solution, then forming a uniformly mixed solution by mixing the separately prepared solutions, and molding the result to a film. In addition, the acryl-based film may be any one of an unoriented film or an oriented film. When the acryl-based film is an oriented film, it may be either a monoaxially oriented film or a biaxially oriented film, and when the acryl-based film is a biaxially oriented film, it may be any one of a simultaneous biaxially oriented film or a sequential biaxially oriented film.

Meanwhile, the polarizing plate of the present invention may further include a primer layer in between the adhesive layer and the protective film for further improving adhesive strength. Herein, the primer layer may be formed using a method of applying a coating solution including a water dispersible polymer resin, water dispersible fine particles and water on the protective film using a bar coating method, a gravure coating method or the like, and drying the result. Examples of the water dispersible polymer resin may include a water dispersible polyurethane-based resin, a water dispersible acryl-based resin, a water dispersible polyester-based resin or a combination thereof, and as the water dispersible fine particles, inorganic-based fine particles such as silica, titania, alumina and zirconia, organic-based fine particles formed with a silicone-based resin, a fluorine-based resin, a (meth)acryl-based resin, a cross-linked polyvinyl alcohol and a melamine-based resin, or a combination thereof, may be used, but the examples are not limited thereto.

3. Optical Device

Such a polarizing plate described above may be favorably used for optical devices such as liquid crystal display devices. Examples of the optical device may include a liquid crystal display device including a liquid crystal panel, and polarizing plates each provided on both surfaces of this liquid crystal panel, and herein, at least one of the polarizing plates may be the polarizing plate according to the present invention. Herein, the types of the liquid crystal panel included in the liquid crystal display device are not particularly limited. For example, known panels including panels using a passive matrix method such as a twisted nematic (TN) type, a super twisted nematic (STN) type, a ferroelectric (F) type or a polymer dispersed (PD) type; panels using an active matrix method such as a two terminal type or a three terminal type; and an in plane switching (IPS) panel and a vertical alignment (VA) type panel may all be used without being limited by the types. In addition, types of other constitutions forming a liquid crystal display device such as upper and lower substrates (ex. color filter substrate or array substrate) are not particularly limited as well, and constitutions known in the art may be employed without limit.

Hereinafter, the present invention will be described in more detail with reference to specific examples.

PREPARATION EXAMPLE 1

Preparation of Acryl-based Protective Film

Raw material pellets were prepared by supplying a resin composition obtained by uniformly mixing poly(N-cyclohexylmaleimide-co-methylmethacrylate), a styrene-maleic anhydride copolymer resin and a phenoxy-based resin in a weight ratio of 100:2.5:5 to a 24 φ extruder substituted with nitrogen from a raw material hopper to an extruder, and melting the result at 250° C.

As the phenoxy-based resin, PKFE (Mw=60,000, Mn=16,000, Tg=95° C.) manufactured by InChem Corporation (InChemRez) was used. As the styrene-maleic anhydride copolymer resin, Dylaeck 332 that is 85% by weight of styrene and 15% by weight of maleic anhydride was used, and as the poly(N-cyclohexylmaleimide-co-methylmethacrylate) resin, a compound having the N-cyclohexylmaleimide content in 6.5% by weight when analyzed using an NMR was used.

The obtained raw material pellets were vacuum dried, were melted at 260° C. using an extruder, then passed through a coat-hanger-type T-die, and then passed through a chrome plating casting roll and a drying roll, and as a result, a film having a thickness of 150 μm was prepared. An acrylic film was prepared by orienting this film to a percentage of 170% in an MD direction at 125° C. using the speed difference of the rolls with a pilot orientation apparatus.

The acrylic film prepared through the process described above was corona treated, and a primer composition, in which 20 parts by weight of an oxazoline cross-linking agent (manufactured by Nippon Shokubai Co. Ltd., WS700) was added to a primer composition having a solid content of 10% by weight prepared by diluting CK-PUD-F (urethane dispersion manufactured by Chokwang Paint Ltd.) with pure water, was coated on one surface of the acrylic film using a #7 bar, and the result was oriented to a percentage of 190% in a TD direction at 130° C. using a tenter, and finally, an acryl-based protective film having a primer layer thickness of 400 nm was prepared.

PREPARATION EXAMPLE 2

Preparation of Adhesive Composition (1) Adhesive Composition A

Adhesive Composition A was prepared by mixing 3 parts by weight of irgacure-819 (manufactured by Ciba Specialty Chemicals Inc.), a radical initiator, to 100 parts by weight of a resin composition prepared by mixing 50 parts by weight of 2-hydroxyethyl acrylate and 50 parts by weight of a compound represented by the following [Chemical Formula 11].

[Chemical Formula 11]

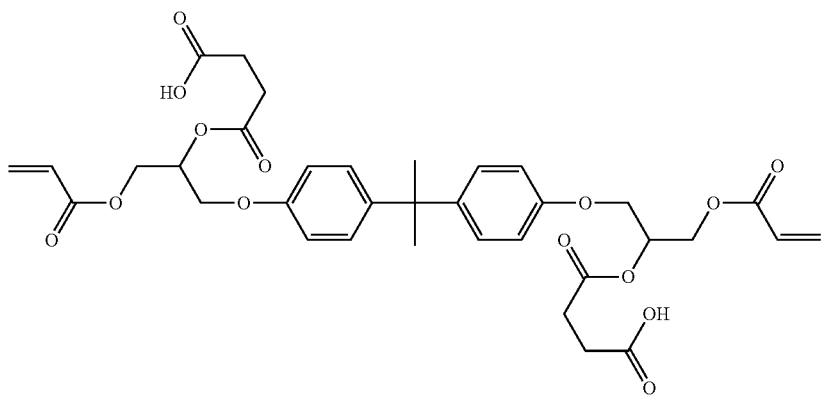

(2) Adhesive Composition B

Adhesive Composition B was prepared by mixing 3 parts by weight of irgacure-819 (manufactured by Ciba Specialty Chemicals Inc.), a radical initiator, to 100 parts by weight of a resin composition prepared by mixing 50 parts by weight of 2-hydroxyethyl acrylate and 50 parts by weight of a compound represented by the following [Chemical Formula 12].

[Chemical Formula 12]

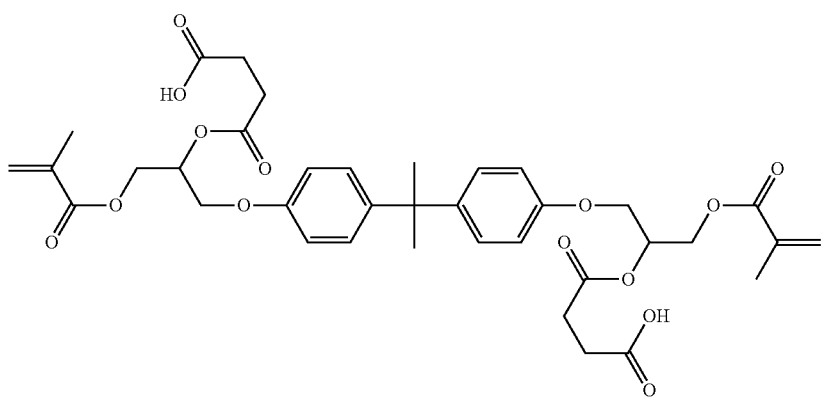

(3) Adhesive Composition C

Adhesive Composition C was prepared by mixing 3 parts by weight of irgacure-819 (manufactured by Ciba Specialty Chemicals Inc.), a radical initiator, to 100 parts by weight of a resin composition prepared by mixing 50 parts by weight of 2-hydroxyethyl acrylate and 50 parts by weight of acrylomorpholine.

(4) Adhesive Composition D

Adhesive Composition D was prepared by mixing 3 parts by weight of irgacure-819 (manufactured by Ciba Specialty Chemicals Inc.), a radical initiator, to 100 parts by weight of a resin composition prepared by mixing 50 parts by weight of 2-hydroxyethyl acrylate and 50 parts by weight of dipropylene glycol diacrylate.

(5) Adhesive Composition E

Adhesive Composition E was prepared by mixing 3 parts by weight of irgacure-819 (manufactured by Ciba Specialty Chemicals Inc.), a radical initiator, to 100 parts by weight of a resin composition prepared by mixing 50 parts by weight of 2-hydroxyethyl acrylate and 50 parts by weight of acrylic acid.

(6) Adhesive Composition F

Adhesive Composition F was prepared by mixing 3 parts by weight of irgacure-819 (manufactured by Ciba Specialty Chemicals Inc.), a radical initiator, to 100 parts by weight of a resin composition prepared by mixing 50 parts by weight of 2-hydroxyethyl acrylate and 50 parts by weight of a compound represented by the following [Chemical Formula 13].

[Chemical Formula 13]

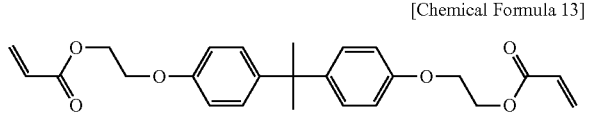

EXAMPLE 1

The Adhesive Composition A was applied on the primer layer of the acrylic film-based protective film prepared in Preparation Example 1 using a dropping pipette, and the result was laminated on both surfaces of a polarizer (PVA element), and then the result passed through a laminator after setting the condition so that the adhesive layer has a final thickness of 1 to 2 μm. Next, ultraviolet rays of 900 mJ/cm² irradiated on the surface laminated with the acrylic film using a UV irradiator (fusion lamp, D bulb), and as a result, a polarizing plate was prepared. The polarizing plate was prepared in an environment of a temperature of 20° C. and humidity of less than 30%.

EXAMPLE 2

A polarizing plate was prepared in the same manner as in Example 1 except that Adhesive Composition B was used instead of Adhesive Composition A.

COMPARATIVE EXAMPLE 1

A polarizing plate was prepared in the same manner as in Example 1 except that Adhesive Composition C was used instead of Adhesive Composition A.

COMPARATIVE EXAMPLE 2

A polarizing plate was prepared in the same manner as in Example 1 except that Adhesive Composition D was used instead of Adhesive Composition A.

COMPARATIVE EXAMPLE 3

A polarizing plate was prepared in the same manner as in Example 1 except that Adhesive Composition E was used instead of Adhesive Composition A.

COMPARATIVE EXAMPLE 4

A polarizing plate was prepared in the same manner as in Example 1 except that Adhesive Composition F was used instead of Adhesive Composition A.

Peel strength of the polarizing plate prepared in Examples 1 and 2 and Comparative Examples 1 to 4, and a glass transition temperature and water resistance of the cured adhesive were measured and shown in the following [Table 1]. The measurement methods are as follows.

1. Evaluation on peel strength of polarizing plate: A peeling test was carried out using a polarizing plate cut into pieces having a width of 20 mm, and a length of 100 mm, and the peel strength of the polarizer and the protective film was measured at a speed of 300 m/min and 90 degrees using a texture analyzer apparatus (TA-XT Plus manufactured by Stable Micro Systems, Ltd.). Herein, the peel strength of greater than 2.5 N/2 cm was marked as ⊚, the peel strength of 1.5 to 2.5 N/2 cm was marked as ○, and the peel strength of less than 1.5 N/2 cm was marked as X.

2. Evaluation on glass transition temperature: a slice of the cured adhesive of the polarizing plate was taken and a glass transition temperature was measured using a differential scanning calorimetry (DSC, manufactured by Mettler-Toledo International, Inc.). The measurement temperature range was −30° C. to 200° C., and scanning was carried out twice by 10° C. each per minute, and the measured glass transition temperature is a glass transition temperature at the second scanning.

3. Evaluation on water resistance: the polarizing plate was laminated on a glass substrate, and then immersed in a thermostat at 60° C. Water resistance was determined after 24 hours by the discoloration at the end of the polarizing plate, and when there was no discoloration, it was marked as excellent, and when there was deformation, it was marked as poor.

TABLE 1

| Category | Composition | Water Resistance | Peel Strength | Glass Transition Temperature [° C.] | Others |
|---|---|---|---|---|---|
| Example 1 | A | Excellent | ◎ | 61 | — |
| Example 2 | B | Excellent | ◎ | 68 | — |
| Comparative Example 1 | C | Poor | ○ | 63 | — |
| Comparative Example 2 | D | Excellent | X | 46 | — |
| Comparative Example 3 | E | Poor | ◎ | 80 | Strong Acid Smell |
| Comparative Example 4 | F | Excellent | X | 60 | — |

As shown in Table 1, in Examples 1 and 2 including both the first compound and the second compound, it was seen that adhesive strength was excellent, water resistance was excellent, and the cured adhesive layer had a high glass transition temperature.

However, in Comparative Example 1, it was seen that the cured adhesive layer was able to have a relatively high glass transition temperature by adding acrylomorpholine, however, water resistance was poor.

In addition, in Comparative Example 2, it was seen that water resistance was able to be improved by dipropylene glycol diacrylate, however, adhesive strength was very poor and the cured adhesive layer had a low glass transition temperature.

Furthermore, in Comparative Example 3, it was seen that the cured adhesive layer was able to have a high glass transition temperature by adding acrylic acid, however, water resistance was poor, and there was a strong acid smell in the polarizing plate.

In addition, in Comparative Example 4, a bisphenol-type acryl-based compound that does not include a carboxyl group was added as the second compound, and it was seen that adhesive strength was reduced as humidity increased.

Hereinbefore, examples of the present invention have been described in detail, however, claims of the present invention are not limited thereto, and it will be apparent to those skilled in the art that various modifications and changes may be made without departing from the spirit of the present invention described in the claims.

The invention claimed is:

1. A radical-curable adhesive composition comprising:
   a (A) first compound represented by the following Chemical Formula I;
   a (B) radical-curable second compound having two or more benzene rings, two or more (meth)acryloyl groups and two or more carboxyl groups in each molecule; and
   a (C) radical initiator:

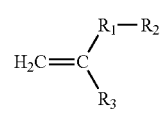

[Chemical Formula I]

wherein $R_1$ is an ester group or an ether group; $R_2$ is a $C_{1\sim10}$ alkyl group, a $C_{4\sim10}$ cycloalkyl group or a combination thereof, and herein, $R_2$ has at least one hydroxyl substituent in the molecule; and $R_3$ is hydrogen, or a substituted or unsubstituted $C_{1\sim10}$ alkyl group.

2. The radical-curable adhesive composition of claim 1, wherein the second compound is a compound represented by the following Chemical Formula II:

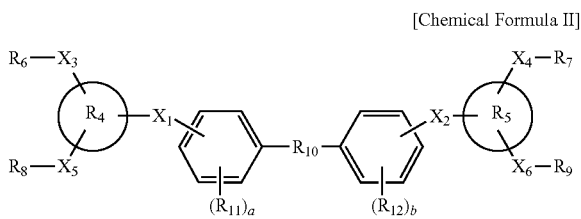

[Chemical Formula II]

wherein $R_4$ and $R_5$ are each independently a $C_{1\sim10}$ aliphatic chain, a $C_{4\sim14}$ aliphatic ring, a $C_{6\sim14}$ aromatic ring or a combination thereof; $R_6$ and $R_7$ are each independently a $C_{1\sim14}$ alkyl group, a $C_{4\sim14}$ cycloalkyl group, a $C_{6\sim14}$ aryl group or a combination thereof, and herein, $R_6$ and $R_7$ each independently have at least one carboxyl substituent in the molecule; $R_8$ and $R_9$ are each independently an acryloyl group or a methacryloyl group; $R_{10}$ is a single bond or a $C_{1\sim10}$ alkylene group; $R_{11}$ and $R_{12}$ are each independently a halogen atom or a $C_{1\sim10}$ alkyl group; a and b are each independently an integer of 0 to 2; $X_1$ and $X_2$ are each independently a single bond or —O—; $X_3$ and $X_4$ are each independently a single bond, —O—, —CO—, —COO— or —OCO—; and $X_5$ and $X_6$ are each independently a single bond or —O—.

3. The radical-curable adhesive composition of claim 1 comprising:
   the first compound in 10 to 80 parts by weight;
   the second compound in 10 to 80 parts by weight; and
   the radical initiator in 0.5 to 10 parts by weight, with respect to 100 parts by weight of the radical-curable adhesive composition.

4. The radical-curable adhesive composition of claim 1, wherein the first compound includes one or more types of compounds selected from the group consisting of compounds represented by the following Chemical Formula 1 to Chemical Formula 10:

[Chemical Formula 1]

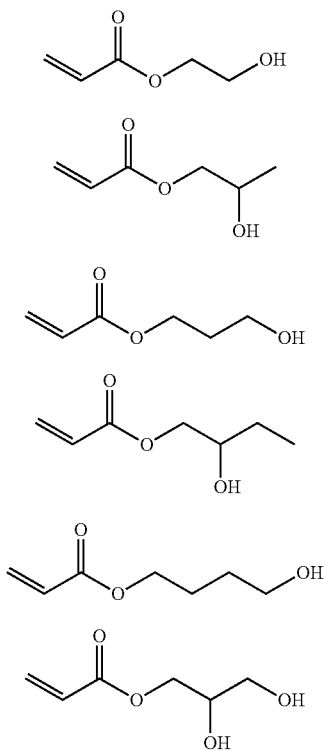

[Chemical Formula 2]

[Chemical Formula 3]

[Chemical Formula 4]

[Chemical Formula 5]

[Chemical Formula 6]

[Chemical Formula 7]

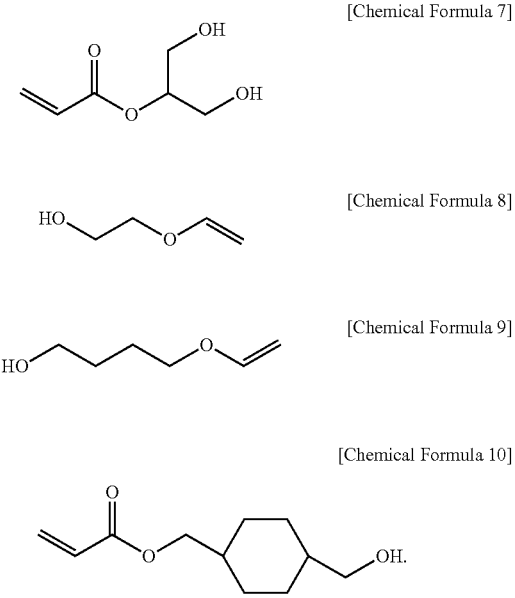

[Chemical Formula 8]

[Chemical Formula 9]

[Chemical Formula 10]

5. The radical-curable adhesive composition of claim 1, wherein the second compound includes one or more types of compounds selected from the group consisting of compounds represented by the following Chemical Formula 11 and Chemical Formula 12:

[Chemical Formula 11]

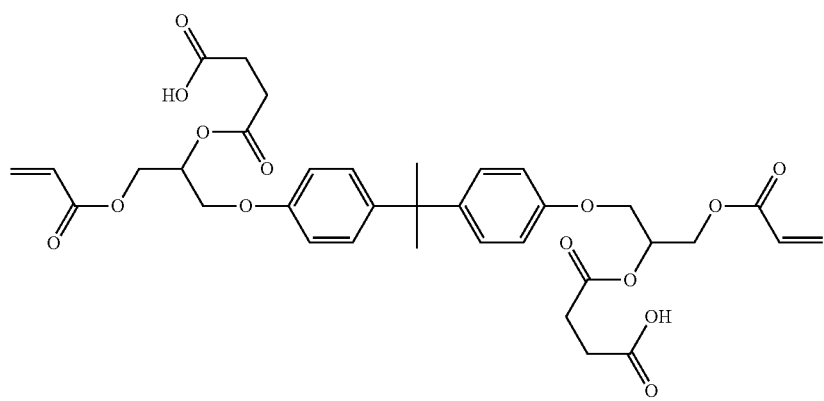

[Chemical Formula 12]

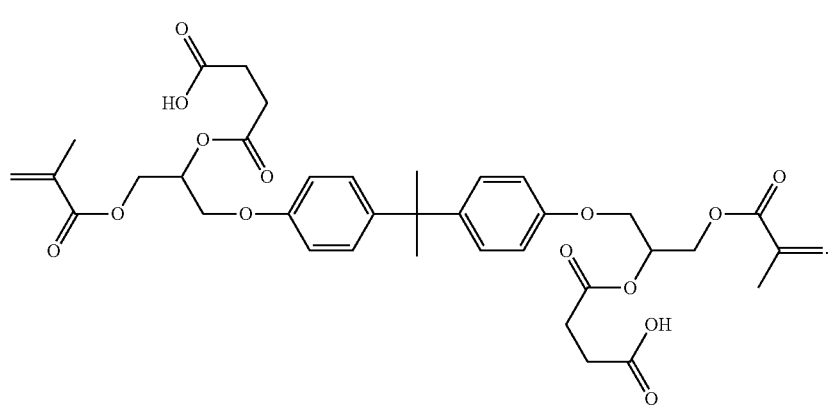

6. The radical-curable adhesive composition of claim 1, wherein an acid value of the second compound is 50 to 300 mg KOH/g.

7. The radical-curable adhesive composition of claim 1, further comprising a photoacid generator.

8. The radical-curable adhesive composition of claim 1, which has a glass transition temperature of 60° C. or higher after curing.

9. The radical-curable adhesive composition of claim 1, which has viscosity of 10 to 200 cP.

10. A polarizing plate comprising:
a polarizer;
an adhesive layer formed on at least one surface of the polarizer; and
a polarizer protective film formed on the adhesive layer, wherein the adhesive layer is formed using the radical-curable adhesive composition of claim 1.

11. A polarizing plate comprising:
a polarizer;
an adhesive layer formed on at least one surface of the polarizer; and
a polarizer protective film formed on the adhesive layer, wherein the adhesive layer is formed using the radical-curable adhesive composition of claim 2.

12. A polarizing plate comprising:
a polarizer;
an adhesive layer formed on at least one surface of the polarizer; and
a polarizer protective film formed on the adhesive layer, wherein the adhesive layer is formed using the radical-curable adhesive composition of claim 3.

13. A polarizing plate comprising:
a polarizer;
an adhesive layer formed on at least one surface of the polarizer; and
a polarizer protective film formed on the adhesive layer, wherein the adhesive layer is formed using the radical-curable adhesive composition of claim 4.

14. A polarizing plate comprising:
a polarizer;
an adhesive layer formed on at least one surface of the polarizer; and
a polarizer protective film formed on the adhesive layer, wherein the adhesive layer is formed using the radical-curable adhesive composition of claim 5.

15. A polarizing plate comprising:
a polarizer;
an adhesive layer formed on at least one surface of the polarizer; and
a polarizer protective film formed on the adhesive layer, wherein the adhesive layer is formed using the radical-curable adhesive composition of claim 6.

16. A polarizing plate comprising:
a polarizer;
an adhesive layer formed on at least one surface of the polarizer; and
a polarizer protective film formed on the adhesive layer, wherein the adhesive layer is formed using the radical-curable adhesive composition of claim 7.

17. A polarizing plate comprising:
a polarizer;
an adhesive layer formed on at least one surface of the polarizer; and
a polarizer protective film formed on the adhesive layer, wherein the adhesive layer is formed using the radical-curable adhesive composition of claim 8.

18. A polarizing plate comprising:
a polarizer;
an adhesive layer formed on at least one surface of the polarizer; and
a polarizer protective film formed on the adhesive layer, wherein the adhesive layer is formed using the radical-curable adhesive composition of claim 9.

19. The polarizing plate of claim 10, which is a polyvinyl alcohol-based film in which iodine or dichroic dye is adsorbed and oriented.

* * * * *